United States Patent [19]
Waldrum

[11] 3,897,296
[45] July 29, 1975

[54] THERMAL WELDING OF PLASTIC
[75] Inventor: John E. Waldrum, Ambler, Pa.
[73] Assignee: Amchem Products, Inc., Ambler, Pa.
[22] Filed: July 12, 1973
[21] Appl. No.: 378,767

[52] U.S. Cl. ................ 156/304; 156/258; 156/306, 156/499; 156/535
[51] Int. Cl. ............................................ B29c 19/00
[58] Field of Search ........... 156/155, 306, 322, 324, 156/499, 535, 304, 258

[56] References Cited
UNITED STATES PATENTS

| | | | |
|---|---|---|---|
| 2,379,500 | 7/1945 | Steffens | 156/304 X |
| 3,282,766 | 11/1966 | Wright | 156/499 |
| 3,458,380 | 7/1969 | Kipp | 156/306 |
| 3,560,291 | 2/1971 | Foglia et al. | 156/229 |
| 3,591,441 | 7/1971 | Nelson | 156/498 |
| 3,810,806 | 5/1974 | Swartz | 156/380 |

*Primary Examiner*—William A. Powell
*Assistant Examiner*—Brian J. Leitten
*Attorney, Agent, or Firm*—Caesar, Rivise, Bernstein & Cohen

[57] ABSTRACT

A method of welding two plastic surfaces together comprises the steps of: juxtaposing the surfaces, heating the surfaces to a temperature approaching the flashpoint of the plastic surfaces to liquify the surfaces, removing a portion of the liquified surfaces to expose unoxidized surfaces therebeneath and immediately thereafter bringing the unoxidized surfaces into abutment with one another. The heating of the juxtaposed surfaces is accomplished by contacting the surfaces with a heated tool which has been preheated to a temperature approaching the flashpoint of the plastic surfaces. The tool also serves to remove a portion of the liquified surfaces. Various apparatus are disclosed for carrying out the method. In one embodiment, the apparatus includes a reciprocating heated tool. In another apparatus, the heated tool is a rotating disc. In yet another apparatus, the heated tool is a continuously circulating band. In yet another embodiment of the invention, the apparatus comprises a hand-held portable, heated tool. Various plastic articles are welded utilizing the method and the apparatus disclosed.

33 Claims, 29 Drawing Figures

PATENTED JUL 29 1975

3,897,296

SHEET 1

THERMAL WELDING OF PLASTIC

This invention relates generally to surface bonding of plastics and more particularly to plastic welding techniques and apparatus therefor.

There presently exists a strong demand for welding techniques to enable plastic surfaces to be as easily and securely joined to one another as can be accomplished utilizing conventional metal welding techniques. Such a plastic welding technique would enable the commerically feasible fabrication of large plastic articles or intricate articles from various stock plastic shapes, e.g. rods, tubes, sheets, etc., which heretofore has been extremely different and expensive to accomplish.

Heretofore, the prior art plastic welding techniques have found limited use in the fabrication of small or low strength articles, since such techniques have generally resulted in inferior weld joints, that is joints whose strength does not nearly approach the strength of the plastic itself.

The lack of a viable plastic welding technique has severely limited various industries in the manner in which plastic articles are produced and has effectively precluded the large scale commercial production of large and intricate plastic articles. For example, plastic containers, such as drums, tanks, bottles, etc. are commonly made utilizing blow-molding techniques. As will be appreciated by those skilled in the art, blow-molding is a time consuming and relatively expensive process and is generally limited to the production of relatively simple and moderately sized articles.

In order to form more intricate plastic articles, it is a common practice to utilize injection molding techniques. However, even injection molding techniques prove insufficient to produce very intricately shaped articles. Furthermore, the injection molding process is quite expensive, is slow and is severely limited in the size of the article to be produced thereby.

In U.S. Pat. No. 3,368,823 (Wood), there is shown apparatus for heat sealing overlapping portions of a molecularly longitudinally oriented polymeric binding strap. The method comprises inserting a tool between abutting opposed surfaces of the strap and thereafter heating the tool to a moderate elevated bonding temperature, e.g. 750° F. This causes the area of the strap in contact with the tool to soften or melt, whereupon the heating element is automatically withdrawn and the surfaces of the strap are pressed together to complete the joint.

The technique disclosed by Wood has been found to be less than satisfactory to join plastic articles in which the joint therebetween is to be subjected to substantial stresses.

It is a general object of this invention to provide a novel method for welding plastic surfaces together which overcomes many of the disadvantages of the prior art.

It is a further object of this invention to provide a novel method for welding various types of plastic articles wherein the strength of the weld joint approaches the strength of the plastic itself.

It is still another object of this invention to provide various articles welded utilizing the process of this invention.

It is still a further object of this invention to provide novel apparatus for carrying out the method of this invention and for producing the articles of this invention.

These and other objects of this invention are achieved by providing a method of welding two plastic surfaces capable of being liquified on the surface thereof together in a first zone comprising juxtaposing the surfaces, heating the juxtaposed surfaces to a temperature approaching the flashpoint of the plastic surfaces to liquify a portion of the surfaces, removing a portion of the liquified surfaces to expose unoxidized surfaces therebeneath and immediately thereafter bringing the unoxidized surfaces into abutment with one another. The heating of the juxtaposed surfaces is accomplished by contacting the surfaces with a portion of a tool which has been preheated to a temperature approaching the flashpoint of the plastic. There is relative movement between the preheated portion of the tool and the juxtaposed surfaces to effect the wiping away of the liquified surfaces by the tool.

Other objects and many of the attendant advantages of this invention will be readily appreciated as the same becomes better understood by reference to the following detailed description when considered in connection with the accompanying drawings wherein.

Referring now to the various figures of the drawing wherein like reference characters refer to like parts, there is shown in FIGS. 1 through 4 an improved method for welding plastic surfaces together.

It has been found that the major impediment to the successful welding of plastic surfaces is the presence of oxdized layers on the surfaces, since such layers preclude the complete intermixing of the softened plastic of the surfaces to be joined and thus prevent the creation of a homogeneous weld joint. As will be appreciated, oxidized layers on the plastic surfaces naturally result when the plastic is exposed to air. The improved method of the instant invention effects the removal of at least a portion of such oxidized layers during the welding process and produces a weld joint whose strength approaches the strength of the plastic itself.

The method in accordance with this invention basically comprises the successive steps of preheating a tool to a minimum temperature defined as at least 50° above the melting point of the plastic but at a temperature sufficient to effectuate the removal of oxidized surfaces thereon to a temperature and a maximum temperature defined as approaching the flashpoint of the plastic surfaces. As used herein, the term flashpoint refers to the temperature at which the plastic ignites or otherwise commences decomposing. The plastic surfaces to be welded are then juxtaposed, whereupon the preheated tool is brought into contact with the juxtaposed surfaces. This action results in the rapid liquification of a portion of the juxtaposed oxidized plastic surfaces. The tool is then wiped across the liquified oxidized surfaces to remove said surfaces and thereby expose unoxidized plastic surfaces therebeneath. Immediately after the wiping away of the liquified oxidized surfaces, the newly exposed unoxidized surfaces are brought into contact with one another and are allowed to cool, thereby completing the weld joint. The tool with the residue of the removed liquified oxidized surfaces thereon can then be related to a temperature approaching the flashpoint of the plastic to cause the plastic adhered to it to decompose and thus ready the tool for another welding operation.

Figure 1:
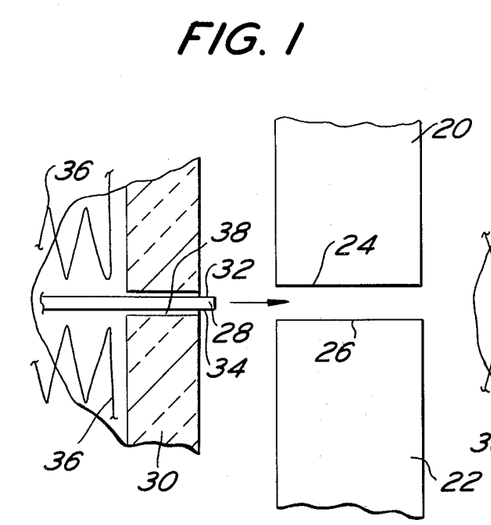
FIG. 1 is a schematic representation of an initial step in a welding method in accordance with one aspect of this invention.

In FIG. 1 there is shown the initial step in the welding process of this invention. As can be seen, a pair of plastic members 20 and 22 are disposed in a manner so as to juxtapose their end surfaces 24 and 26, respectively, to prepare such surfaces for welding.

A tool 28 is disposed within a heating chamber 30. The tool is a thin planar member having a pair of opposed surfaces 32 and 34. The heating chamber 30 includes plural resistance heating elements 36 therein and also includes an opening 38 through which the tool reciprocates. The tool is heated within the chamber to a temperature closely approaching the flashpoint of the plastic surfaces 24 and 26.

Figure 2:
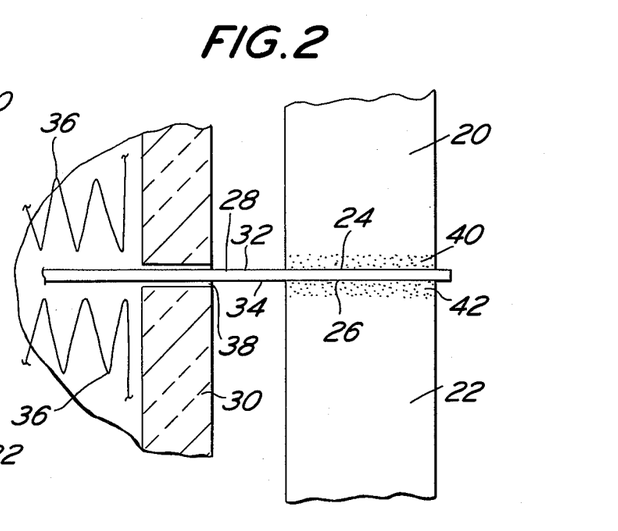
FIG. 2 is a schematic view of a subsequent step in the welding method of FIG. 1.

Once the tool is heated and the surfaces 24 and 26 are juxtaposed as shown in FIG. 1, the tool is extended through the opening 34 in the direction of the arrow to a position immediately between the juxtaposed surfaces. The juxtaposed surfaces are then brought into contact with the opposed surfaces 32 and 34 of the tool, whereupon the surfaces 24 and 26 melt and liquify. This step is shown in FIG. 2 wherein the liquified plastic surfaces are denoted by the reference numerals 40 and 42.

The heated tool 28 contacts the surfaces 24 and 26 of the plastic members for only a very short period of time such that the heat therefrom does not penetrate substantially into the body of the plastic members 20 and 22. This action ensures that only an extremely thin surface layer of the plastic surfaces 24 and 26 is liquified, which layer includes the oxidized surface layer.

Figure 3:
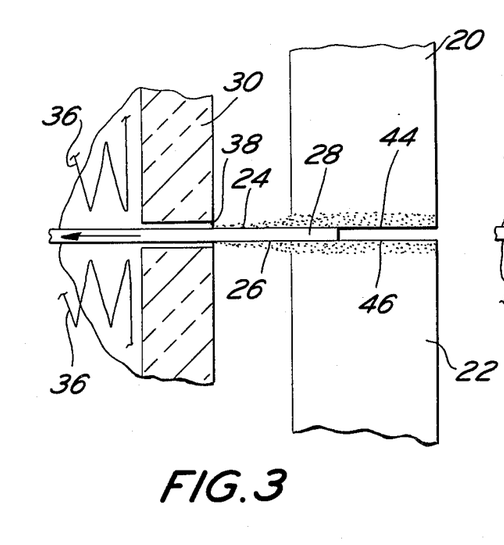
FIG. 3 is a schematic view of yet a further step in the welding method of FIG. 1.

Upon the liquification of the surfaces 24 and 26, the liquified oxidized layer of those surfaces adheres to the abutting tool surfaces 32 and 34, respectively. The tool is then withdrawn in the direction of the arrow from between the plastic members and back into the heating chamber. This step is shown in FIG. 3.

The relative movement between the tool and the plastic members 20 and 22 wipes away the adhered liquified plastic layers from the plastic surfaces 24 and 26 and exposes unoxidized plastic surfaces 44 and 46, respectively, therebeneath. The exposed unoxidized surfaces 44 and 46 are molten and may be in a liquid or in an otherwise soft state.

Immediately after the unoxidized surfaces 44 and 46 are exposed, the plastic members are moved toward one another to cause the soft and unoxidized surfaces 44 and 46 into contact with each other. Owing to the fact that the abutting surfaces 44 and 46 are unoxidized, there is no oxidized layer at the interface of the abutting surfaces, which layer would tend to impede the free mixing of the softened plastic surfaces. Accordingly, the softened plastic of the abutting surfaces freely intermix, thereby creating a homogeneous weld joint, which, when cooled, exhibits substantially the same tensile strength as the plastic forming it.

Figure 4:
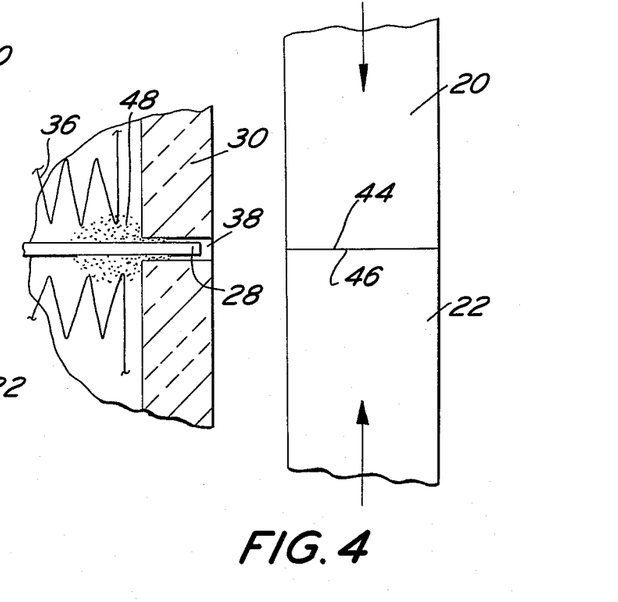
FIG. 4 is a schematic view of a final step in the welding method of FIG. 1.

Once the tool is withdrawn into the heating chamber 30, as shown in FIG. 4, the resistance heating elements 36 reheat the tool to raise its temperature to that approaching the flashpoint of the plastic. This action results in the ignition or decombustion of the plastic which had adhered to the tool, thereby cleaning the tool. The smoke and gaseous products of the combustion are denoted by the reference numeral 48 and are withdrawn from the heating chamber via means (not shown).

In welding large cross section plastic articles or articles of different plastics, the heated tool may be oscillated at a subsonic frequency as it is moved across the surfaces to be welded. Such action effects the mechanical mixture of the exposed molten and unoxidized plastic layers, thereby improving the homogenity of the weld joint.

It has been found that virtually all thermoplastics, e.g. polypropylene, polyethylene, polyvinylchloride, etc., can be successfully welded in accordance with the method of this invention. In addition, other reclaimable plastics including any which melt before charring can be welded in accordance with this invention.

The following is an example of the welding of a high density, injection molded polypropylene cap member having a 1/16 inch thick flange thereon onto the end of a high density, injection molded polypropylene tube having a wall thickness of 1/16 inches utilizing the method of this invention. A reciprocating tool, like that shown in FIGS. 1 through 4, was heated to a temperature in slight excess of 1,000° F. The tool was brought into contact with the edge of a flange and the edge of the tube and maintained in that position for approximately three seconds, during which time the abutting plastic surfaces liquified. The tool was then withdrawn in the manner like that shown in FIG. 3, thereby wiping away the liquified oxidized surface areas and exposing unoxidized surfaces therebeneath.

Immediately after portions of the oxidized surfaces had been removed by the wiping action of the tool, the flange of the cap member and the edge of the tube were brought into contact with one another and were held together under a constant force until the molten plastic of the edge of the flange and the edge of the tube cooled, thereby completing the weld joint. The completed welded article exhibited substantially the same tensile strength at its weld joint as it did at other portions thereof.

It has been found that in welding thermoplastics in accordance with this invention, the temperature of the tool can be extended over a range of several hundred degrees above the minimum temperature at which a successful weld joint results providing the dwell line, i.e. the time that the tool is in contact with the workpieces, is decreased in proportion to the temperature increase. For polypropylene, successful welds can be accomplished in the range of 1,000° F. to 1,300° F. At temperatures on the order of 900° F., the tool tends to stick to the workpieces thus impeding the welding operation and resulting in a somewhat inferior weld joint. At temperatures on the order of 700° F., a totally inferior weld joint results.

Figures 5, 6, 7:
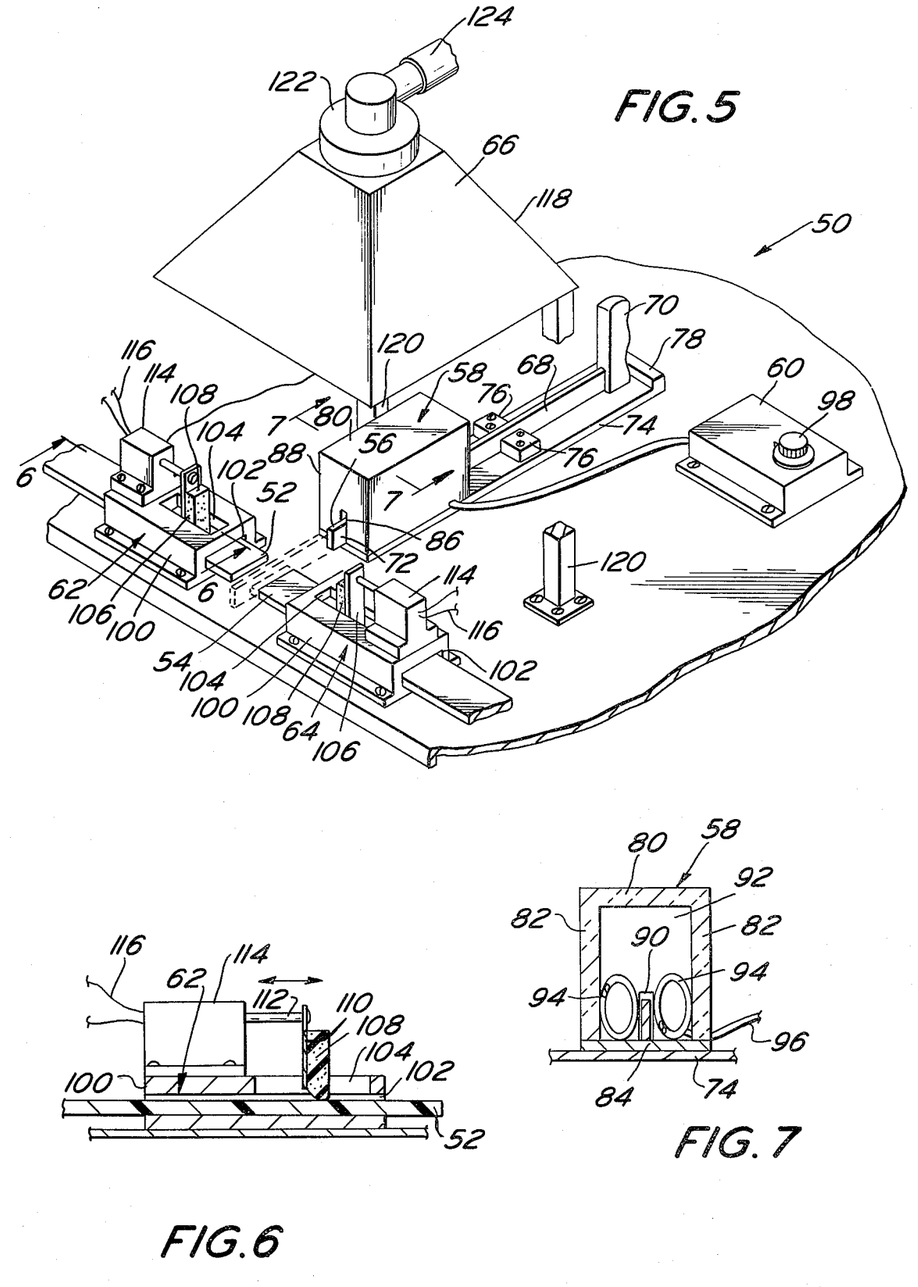
FIG. 5 is a perspective view of a reciprocating welding apparatus in accordance with one aspect of this invention.
FIG. 6 is an enlarged sectional view taken along line 6—6 of FIG. 5.
FIG. 7 is an enlarged sectional view taken along line 7—7 of FIG. 5.

Turning now to FIG. 5 there is shown a reciprocating welding apparatus 50 in accordance with one aspect of this invention. The apparatus 50 is adapted, during each cycle of operation, for welding the ends of two plastic members or workpieces 52 and 54 to one another utilizing the process of this invention. As can be seen, the apparatus 50 basically comprises a reciprocating tool 56 for movement between a heating zone and a welding zone, a heating chamber 58 disposed within the heating zone for heating the tool, control means 60 for adjusting the temperature within the heating chamber, a pair of workpiece holding members 62 and 64 disposed in the welding zone for holding the plastic workpieces 52 and 54 therein and for forcing the ends of said workpieces into abutment with the tool and with each other during the welding operation and ventilating means 66 disposed over the heating zone and welding zone for carrying away smoke and other gaseous products of combustion resulting during the welding operation.

The tool 56 is an elongated blade-like member 68 having a handle 70 at one end thereof. The other end of the tool is the working end 72, i.e. the end which effects the liquification and removal of the oxidized surface layers of the plastic members being welded. The handle 70 is provided to enable one to grasp the tool to slide its working end 72 out of the heating zone or chamber 58 and into the welding zone, i.e. the extended position immediately between the ends of the plastic members 52 and 54 as shown by the dotted lines in FIG. 5. The handle also serves as the means for extracting the working end of the tool from between the ends of the plastic members once their oxidized layers have been liquified in order to remove those layers and expose unoxidized plastic surfaces therebeneath.

The blade of the tool is disposed upon a supporting base 74 and is guided in its reciprocating movement between the heating and welding zones by a pair of spaced guide blocks 76. An upstanding back stop 78 is provided at the rear end of base 74 to ensure that the working end of the tool is fully within the heating chamber after completing a welding cycle.

As can be seen in FIG. 7, the heating chamber 58 is a hollow box-like structure having a top wall 80, side walls 82 and a bottom wall 84, each of which being formed of thermally insulating material, e.g. asbestos. The bottom wall 84 of the heating chamber is disposed upon the support base 74. The heating chamber includes a slot 86 (see FIG. 5) in its front wall 88 and a longitudinally aligned slot 90 (see FIG. 7) in its back wall 92. The slots 86 and 90 serve as the passageway through which the blade 68 of the tool passes during the reciprocating motion thereof.

A pair of resistance heating coils 94 are disposed within heating chamber 58 with each coil extending in the longitudinal direction therethrough and on opposite sides of the slots 86 and 90. In so doing, each side-face of the working portion of the blade is heated equally within the heating chamber. The control means 60 establishes the temperature within the heating chamber via the passage of electrical current through a cable 96 to the heating coils. Preferably, the control means includes a rheostat having an adjustment knob 98. As should thus be appreciated, the temperature within the heating chamber can be established for any particular plastic workpieces by merely rotating the knob 98 to a desired setting.

Each of the plastic workpieces is held in position by a workpiece holding member. For example, workpiece 52 is held in position by holding member 62 and workpiece 54 is held in position by holding member 64. Each holding member is of identical construction and, as can be seen in FIGS. 5 and 6, holder 62 comprises a guide block 100 having a longitudinal opening 102 extending therethrough. The plastic member 52 is inserted within and passes through opening 102. The guide block 100 also includes a longitudinal slot 104 in its top surface, which slot communicates with the opening 102 therein. A pusher member 106 extends into the slot 104 and includes a resilient tip 108 which contacts and makes frictional engagement with the top surface of the plastic workpiece 52 disposed within opening 102. The resilient tip of the pusher is connected to a backing bar 110 which in turn is connected to a reciprocating shaft 112 of a solenoid 114. The solenoid 114 is mounted on the guide block 100 and is adapted upon energization, via wires 116 from suitable control means (not shown), to cause the shaft 112 and the resilient tip 108 carried thereby to move in the direction towards the other workpiece, whereupon the resilient portion of the pusher forces the workpiece in that direction. This action enables the two workpieces to be brought into contact with the heated tool when the tool is extended into the welding zone and also enables the two workpieces to be brought in contact with one another under a constant pressure to complete the weld after the removal of the oxidized surfaces by the retraction of the tool back into the heating zone.

Once the weld is completed, the working portion 72 of the tool is moved back within the heating chamber wherein the plastic which had adhered thereto ignites or otherwise decomposes. This action effectively cleans the tool for another welding cycle. The gaseous products and smoke resulting from the decombustion of the plastic on the tool exit the heating chamber 68 and are trapped by the ventilating means 66 disposed thereabove. The ventilating means comprises a hood 118 which is supported via four legs 120 (only a portion of two of which can be seen in FIG. 5) directly over the heating chamber. The ventilating means also includes an exhaust fan 122 connected to the top of the hood 118 for forcing the trapped gases and smoke into an exhaust line 124 and away from the welding apparatus 50.

While the reciprocating welding apparatus 50 is shown in FIG. 5 welding the abutting ends of two plastic strips, it should be apparent to those skilled in the art that the apparatus 50 can, with slight modification, be utilized to weld the ends of various plastic articles to one another, such as for example the welding of the ends of two rods, the end of a pipe to a cap member, etc.

Figure 8:
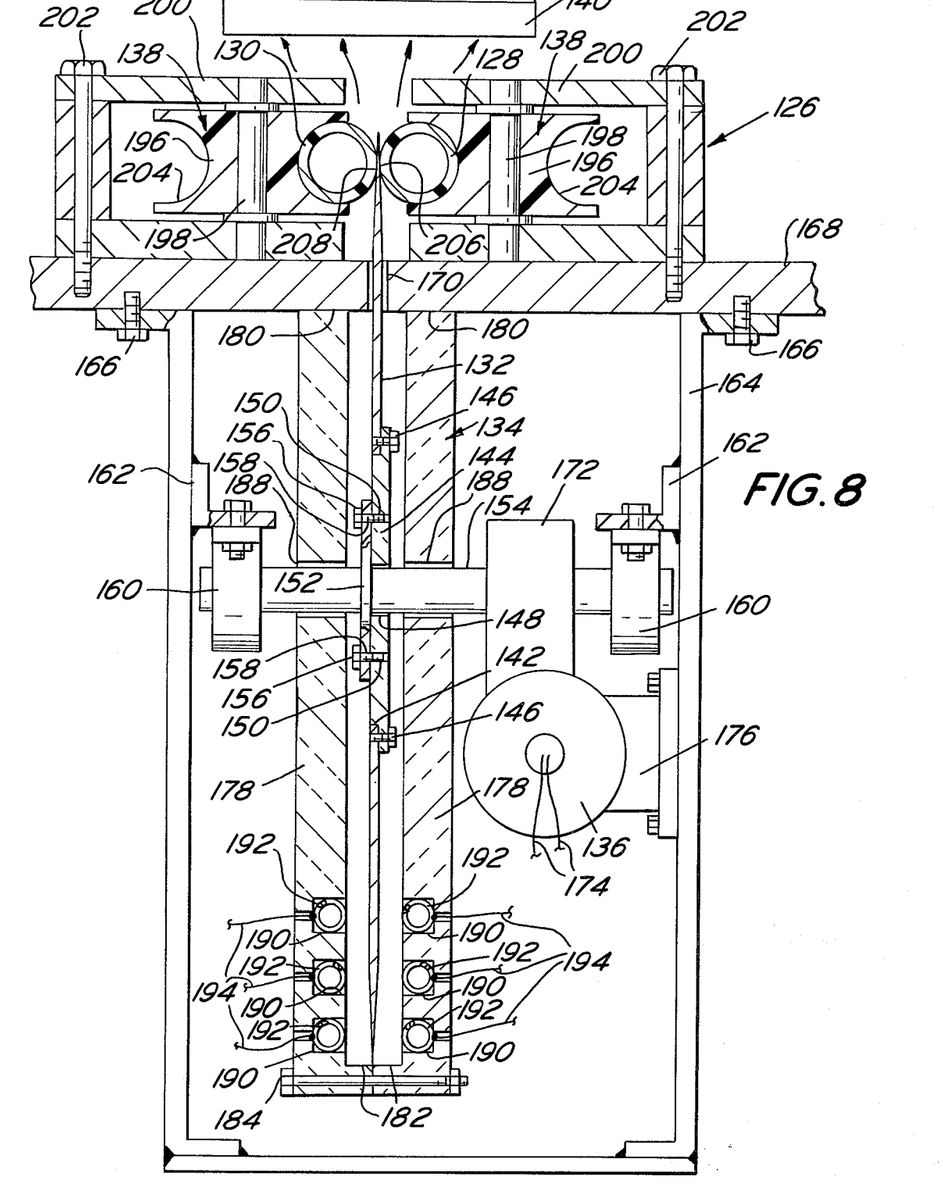
FIG. 8 is a vertical sectional view of a continuous welding apparatus in accordance with another aspect of this invention.

Turning now to FIG. 8 there is shown a continuous welding apparatus 126 in accordance with another aspect of this invention. The apparatus is adapted to weld a continuous seam along two abutting workpieces which are fed into a weld zone. Although the workpieces shown being welded in FIG. 8 comprise plastic tubes 128 and 130, it should be appreciated by those skilled in the art that seams between other types of workpieces can also be welded, such as the seam between abutting edges of plastic sheets, panels, rods, bars, etc.

The continuous welding apparatus 126 basically comprises a welding tool in the form of a rotating disc 132 which while one heated portion thereof is welding another portion is being reheated and cleaned. The disc is arranged in a manner such that when it is rotating a peripheral portion of it moves from a heating zone, wherein that portion is heated to a temperature approaching the flashpoint of the plastic, to a welding zone, wherein the heated portion contacts the workpiece surfaces to be welded to liquify and wipe away oxidized layers thereon, and back to the heating zone. Once back in the heating zone, the portion of the disc having plastic adhered it is reheated to ignite the plastic and ready that portion for continued welding of the seam between the workpieces as the cleaned and reheated portion of the disc rotates back to the welding zone.

Owing to the fact that some portion of the disc is being reheated and cleaned as another portion thereof is welding, the welding operation can continue uninterrupted to produce a welded seam of any given length.

The apparatus 126 also comprises a heating chamber 134 disposed within the heating zone for heating the disc portions rotating therethrough, a motor 136 for rotating the disc 132, workpiece alignment and feed means 138 disposed in the weld zone for feeding the workpieces to the heated disc within the weld zone and for holding the workpieces together as they exit the weld zone upon completion of the weld and ventilating means 140 disposed over the welding zone and the heating zone for carrying away smoke and gaseous products of the combustion of the plastic during the welding process.

Figure 9:
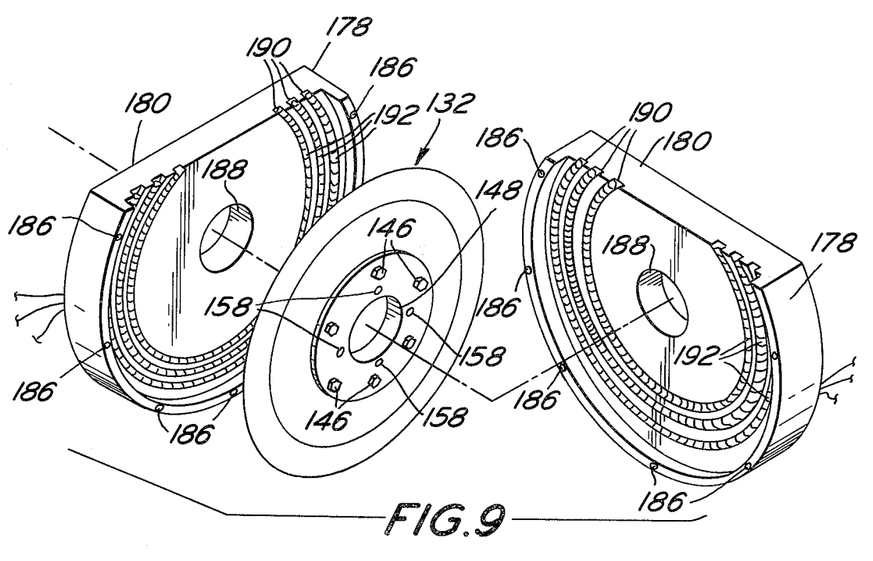
FIG. 9 is an exploded view of a portion of the apparatus shown in FIG. 8.

As can be seen in FIGS. 8 and 9, the disc 132 is a thin metal disc which tapers to a relatively sharp-edged periphery. A hole 142 is provided in the center of the disc for connection to a flanged mounting plate 144. A plurality of screws 146 are utilized to secure the mounting plate 144 to the disc 132. The mounting plate includes a central opening 148 having a plurality of screw holes 150 disposed thereabout. The screw holes 150 serve as the means for mounting the plate 144 and associate disc 132 on a flanged portion 152 of a central rotation shaft 154. To that end, screws 156 are disposed within the holes 150 in the mounting plate and aligned holes 158 in the flanged portion of the shaft 154. The shaft is mounted horizontally within a pair of opposed bearings 160, each of which is connected by a bracket 162 to a support housing 164. The support housing is mounted, via screws 166, below a worktable 168 of the apparatus 126. The worktable includes a slot 170 through which a peripheral portion of the disc extends. A transmission 172 is connected to the shaft 154 and to the motor 136 in order to rotate the shaft about its longitudinal axis, upon the energization of the motor via electric wires 174. As can be seen, the motor is mounted in the support housing via a bracket 176 screwed thereto.

The heating chamber includes a pair of sideplates 178 which are formed of a thermally insulating material such as a ceramic. The sideplates are of generally round shape having a cord section cut away to form a flat end 180. The sideplates 178 each include a flange 182 extending around the periphery of the curved portion of the plate on the inside face thereof. The plates are disposed adjacent to one another with their flanges 182 abutting one another to form a hollow space therebetween in which the major portion of the disc 132 is disposed. The plates are held together to form the heating chamber via bolts 184 (only one of which can be seen in FIG. 8) extending through aligned holes 186 in the flanges 182. A central opening 188 is provided in each sideplate 178 to enable the shaft 154 to pass therethrough. As can be seen, the inside face of each sideplate includes a plurality of concentric grooves 190 disposed close to the flange 182. A resistance heating element or coil 192 is disposed within each groove and is connected to a source of electrical energy via wires 194. As should thus be appreciated, both sides of the portion of the disc which is within the heating chamber at any given moment are heated equally by the adjacent heating elements mounted therein. The heating chamber is mounted below the worktable 168 and within the support housing 164 by means (not shown) with the flat end 180 of each sideplate abutting the bottom surface of the worktable and on opposite ends of the slot 170.

The two workpieces 128 and 130 are fed across the worktable 168 and to the welding zone from an upstream point by either manual or automatic means (not shown). The alignment means 138 are disposed immediately to each side of the portion of the disc 132 extending out of the slot 170 in the worktable and are adapted for guiding the workpieces into engagement with the rotating disc. To that end, each alignment means comprises a concave-faced roller 196 which is journalled on a shaft 198 within a C-shaped mounting bracket 200. Each bracket is secured in position on the worktable by screws 202. The rollers each include a concave face 204 for engaging a substantial portion of the periphery of the workpiece guided thereby. The rollers are spaced from one another by a sufficient distance to ensure that the workpieces make good thermal engagement with the rotating disc.

Operation of the continuous welding apparatus 126 is as follows: The two tubes 128 and 130 are fed across the worktable and through the grooves in the guide rollers 196. This causes the lateral-most peripheral surfaces of tubes 128 and 130, which surfaces are denoted by the reference numerals 206 and 208, respectively, to abut the respective side portions of the rotating disc 132 in the welding zone. During the welding operation the disc 132 is rotated about shaft 154 by motor 136 via transmission 172 to cause successive peripheral portions of the disc to pass adjacent the heating elements 192 in the heating chamber such that the temperature of the portions of the disc approach the flashpoint of the plastic. As the heated peripheral portions of the disc enter the welding zone, their side faces contact the surfaces 206 and 208 of the tubes 128 and 130, respectively, to effect the liquification of those surfaces. The disc rotates at a predetermined speed such that the peripheral portions thereof pass through the weld zone at a greater speed than the speed at which the workpieces are fed therethrough. The resulting relative movement between the rotating disc and the linearly moving workpieces enables the disc to effectively wipe away the liquified oxidized surface areas on the workpieces to expose unoxidized surfaces therebeneath.

The liquified plastic which adheres to a portion of the rotating disc as the portion wipes across the plastic surface being welded, is carried back into the heating zone by the continued rotation of the disc 132, whereupon, the adhered plastic ignites or otherwise decomposes, thereby readying that portion of the disc for welding another portion of the seam upon its rotation back to the weld zone.

Immediately downstream of the rotating disc, the unoxidized surfaces which were exposed by the wiping action of the rotating disc come into contact with one another under the guidance of guide rollers 196 to complete the joinder of the two tubes. The welding of the seam along the two tubes continues without interruption so long as the tubes are fed into the weld zone.

As should be appreciated by those skilled in the art, the speed of rotation of the disc 132 of apparatus 126 should be coordinated with the speed at which the workpieces are fed into the weld zone in order that the surfaces to be welded are sufficiently liquified and cleared of oxidation layers to ensure that a homogeneous weld joint results.

Figure 10:
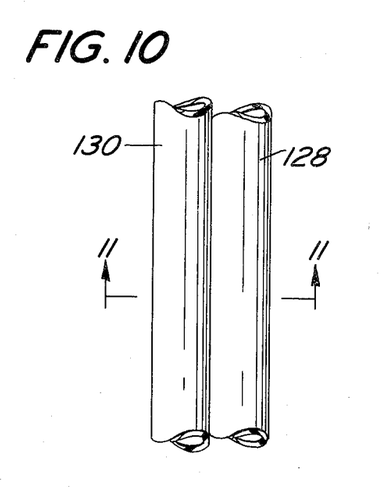
FIG. 10 is a plan view of a portion of a plurality of pipes welded together by the apparatus of FIG. 8.
Figure 11:
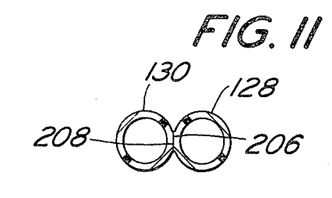
FIG. 11 is a sectional view taken along line 11—11 of FIG. 10.

In FIGS. 10 and 11 there is shown a portion of two tubes 128 and 130 which have been welded together utilizing the apparatus 126. As can be seen, the tubes are joined at their lateral-most peripheral surfaces to produce a relatively complex article including two separated and isolated longitudinal passageways.

While the apparatus 126 is shown welding two tubes together, it should be appreciated by those skilled in the art that any number of tubes can be welded together by merely modifying the shape of the guide rollers 196 or the spacing therebetween and completing plural welding passes. The multiple-tube, welded structures resulting from welding a plurality of tubes in apparatus 126 can be used to form the cooling tubes of a complex heat exchanger. Heretofore, such heat exchangers have been formed of welded metal tubes and not of plastic tubes since the costs of making such a complex article via conventional molding techniques would be prohibitive.

Figure 12:
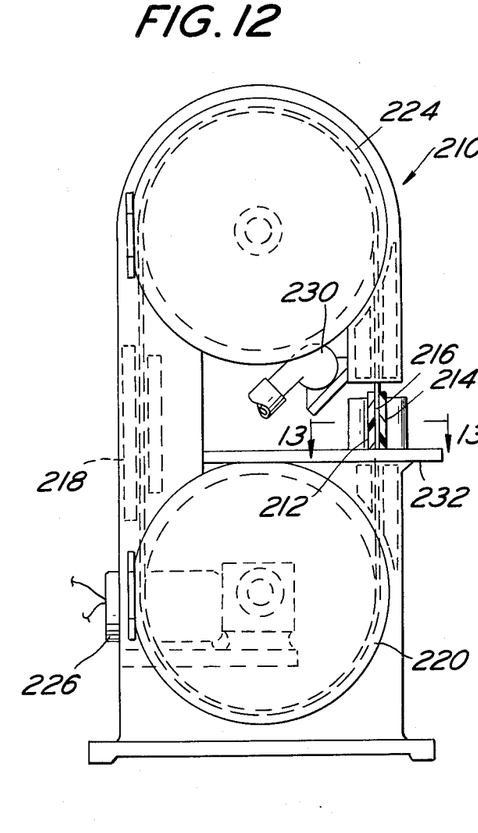
FIG. 12 is a side view of another continuous welding apparatus in accordance with another aspect of this invention.

Turning now to FIG. 12 there is shown a continuous welding apparatus 210 in accordance with another aspect of this invention. The apparatus 210 is adapted to weld a continuous seam between two abutting workpieces 212 and 214 fed into the weld zone. Although the workpieces 212 and 214 are shown as narrow plastic strips which are welded together to form a narrow laminate, it should be appreciated by those skilled in the art that other types of workpieces can be welded to form other articles, such as welding a continuous seam between abutting edges of plastic sheets, panels, rods, bars, tubes, etc.

The apparatus 210 basically comprises a heated welding tool in the form of a constantly circulating thin and narrow metal band 216 which while one heated portion thereof is welding another portion is being reheated and cleaned. The band is arranged such that when it is circulating a portion thereof moves from a heating zone, wherein said portion is heated to a temperature approaching the flashpoint of the plastic to be welded, to a welding zone, wherein the heated portion of the band contacts the workpiece surfaces to be welded to liquify and wipe away oxidized layers therebetween, and back to the heating zone. Once back in the heating zone, the portion of the band having plastic adhered to it is reheated to ignite the adhered plastic and ready that portion of the band for further welding as that portion circulates back to the welding zone. Owing to the fact that some portion of the circulation band is being reheated and cleaned as another portion thereof is welding, the welding operation can continue uninterrupted to produces a welded seam of any given length.

The apparatus 210 also comprises heating means 218 disposed within the heating zone for heating the successive portions of the band circulating therethrough, a pair of rollers 220 and 222 about which the band continuously circulates, an electric motor 226 for driving roller 220 and thereby causing the band 216 to circulate, workpiece alignment means 228 (See FIG. 13) disposed in the weld zone for guiding the workpiece past the circulating heated band within the weld zone and for holding the workpieces together as they exit the weld zone upon completion of the weld and ventilating means 230 disposed over the weld zone for carrying away smoke and gaseous products of the combustion of the plastic during the welding process.

Figure 13:
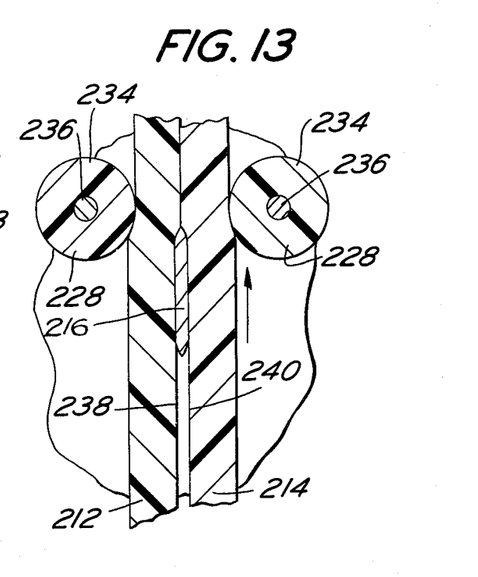
FIG. 13 is an enlarged sectional view taken along line 13—13 of FIG. 12.
Figure 14:
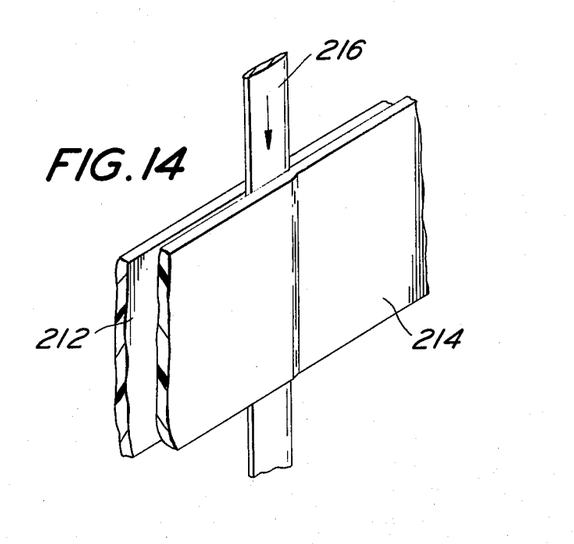
FIG. 14 is an enlarged perspective view of a portion of the apparatus shown in FIG. 12 and the workpiece welded thereby.

As can be seen in FIGS. 12 and 13, the workpiece alignment means 228 are mounted on a horizontal worktable 232 of the apparatus 210. The worktable includes an opening (not shown) through which the band moves as it is driven by roller 220.

Each of the workpiece alignment means comprises a roller 234 journalled for rotation on a shaft 236 projecting normally from the table. The rollers 234 are disposed opposite one another and equidistant from the plane of the circulating band as it passes through the opening in table 232. Furthermore, as can be seen in FIG. 13, the rollers are disposed slightly downstream of the band.

The heating means comprise plural resistance heating elements disposed on opposite sides of the band such that both sides of the band are heated equally as the band circulates through the heating zone.

Operation of the apparatus 210 is as follows: The two plastic workpiece strips 212 and 214 to be welded together are fed across the worktable and in contact with the two side faces of the circulating band 216 in thw weld zone. During the welding operation, the band is circulated through apparatus 210 by the operation of motor 226 driving roller 220 to cause successive portions of the side faces of the band to pass through the heating zone, whereupon the temperature of those portions are raised to a temperature approaching the flashpoint of the plastic. As the heated portions of the band enter the weld zone, the side faces of the band contact the inner surfaces 238 and 240 of workpieces 212 and 214, respectively, to effect the liquification of those surfaces. Since the band is continuously circulating, it moves laterally across the longitudinally fed workpieces which effectively wipes away the liquified oxidized surface areas 238 and 240, respectively, to expose unoxidized surfaces therebeneath. The liquified plastic which adheres to the circulating band as the heated portion wipes across the plastic surfaces is carried back into the heating zone by the continued circulation of the band, whereupon the adhered plastic ignites or otherwise decomposes, thereby readying that portion of the band for welding another portion of the seam of the workpieces upon its circulation back to the weld zone.

Immediately downstream of the band 216, the unoxidized surfaces which were exposed during the wiping action of the band come into contact with one another under the guidance and pressure of rollers 234 to complete the joinder of the two plastic strips. The welding of the seam along the strips continues without interruption so long as the plastic strips continue to be fed into the weld zone.

As should be appreciated by those skilled in the art, the speed of circulation of the band 216 should be coordinated with the speed at which the workpieces are fed through the weld zone in order that the surfaces to be welded are sufficiently liquified and cleaned of oxidation layers to ensure that a homogeneous weld joint results.

Figure 15:
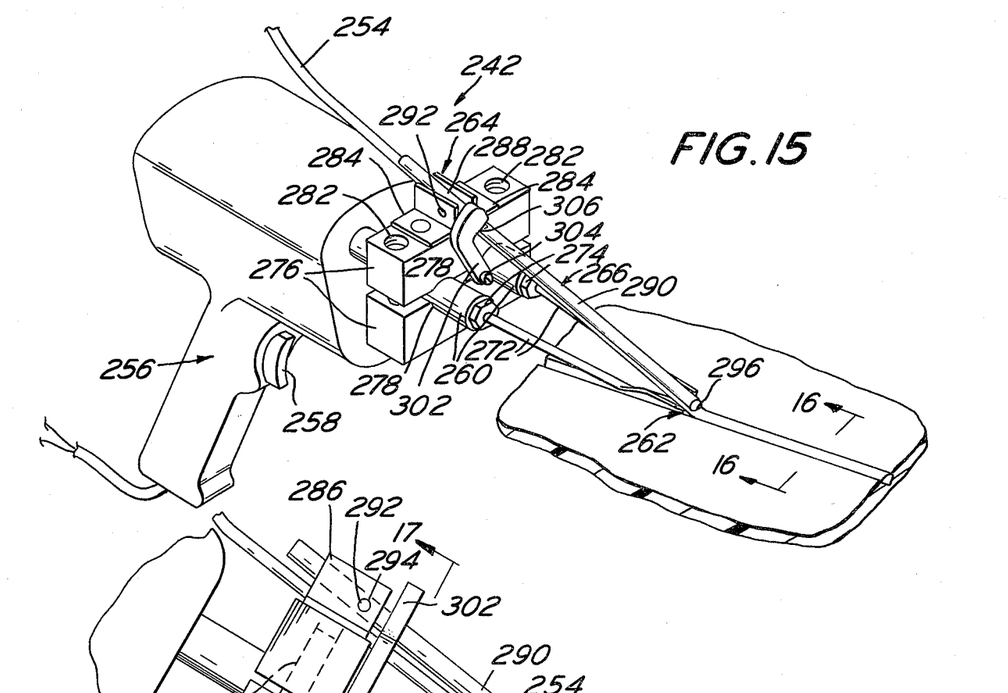
FIG. 15 is a perspective view of a hand-held welding apparatus in accordance with another aspect of this invention.

Turning now to FIG. 15 there is shown a portable, hand-held welding apparatus 242 in accordance with another aspect of this invention. The apparatus 242 is adapted to be held in one's hand to butt weld two beveled plastic edges by feeding and welding a plastic filler rod into the groove formed by those edges.

Figure 19:
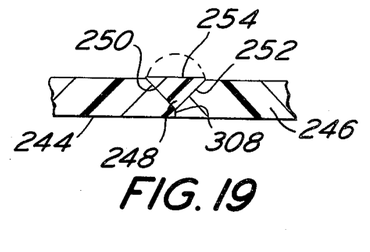
FIG. 19 is a sectional view of the weld joint formed by the apparatus of FIG. 16.

In FIG. 19 is shown the cross sectional view of a pair of plastic members 244 and 246 which have been butt welded utilizing the portable apparatus 242. As can be seen therein, each of the edges of the plastic members are beveled such that when abutted, a V-shaped groove 248 having sides 250 and 252 results. A plastic filler rod 254 is inserted and welded to the beveled surfaces 250 and 252 of the respective plastic members 242 and 246 to complete the weld between those members. The dotted line portion of the filler rod 254 represents the portion of the rod which has been removed from the weld joint after the welding operation has been completed.

As can be seen in FIG. 15, the portable apparatus 242 is a modified, hand-held soldering gun and basically comprises a handle assembly 256 having an on-off trigger switch 258, a pair of electrodes 260 projecting normally from the front portion of the handle assembly and terminating in a V-shaped resistance heating tip 262, a filler rod guide 264 and means 266 for applying pressure to the filler rod during the welding operation.

The V-shaped resistance heating tip 262 of the apparatus is shaped such that its outside surfaces 268 and 270 (see FIG. 18) make contact with the beveled edges 250 and 252, respectively, of the abutting plastic workpieces 244 and 246, respectively. The V-shaped tip includes a pair of long legs 272 projecting therefrom and which are connected, via connectors 274 to the electrodes 260.

The electrodes 260 are connected via the on-off switch 258 to a source of electric power within the handle assembly such as a transformer (not shown), such that upon the depression of the switch, a difference in potential results across the electrode and hence causes current to flow through the resistance heating tip 262. This action raises the temperature of the tip to a temperature approaching the flashpoint of the plastic to be welded.

The filler rod guide 264 includes a pair of mounting blocks 276 having grooves 278 therein and disposed on opposite sides of the electrodes 260, with the electrodes disposed within the grooves. The blocks are connected to one another via screws 280 in aligned holes 284 in the blocks. The top surface of the upper block includes a pair of flanged members 284 connected thereto and having projecting walls 286 which form a guideway 288 therebetween. It is through guideway 288 that the plastic filler rod 254 is fed from means (not shown) to the V-shaped tip 262.

An elongated pressure applying member 290 is mounted for pivotable movement with respect to the walls of the guideway 288. To that end, member 290 includes a pair of pivot pins 292 projecting laterally therefrom and extending into aligned holes 294 in the walls of the guideway. The elongated member extends from the guideway to slightly past the end of the resistance heating tip and terminates at its free end in a flat portion 296 which is adapted to force the filler rod 254 into contact with the inside surfaces 298 and 300 of the resistance heating tip and into contact with the beveled surfaces 250 and 252 of the abutting plastic workpieces. The means for causing the pressure member to force the filler rod into contact with the V-shaped resistance heating tip and the workpieces comprises a latch 302 which is connected to a pivot pin 304 on the front face of the upper support block 276. As can be seen, the latch 302 includes a curved camming portion 306 which makes contact with the pressure member 290 to cause it to pivot toward the V-shaped tip as the latch is pivoted toward the pressure member (clockwise as shown in FIG. 17).

Figure 16:
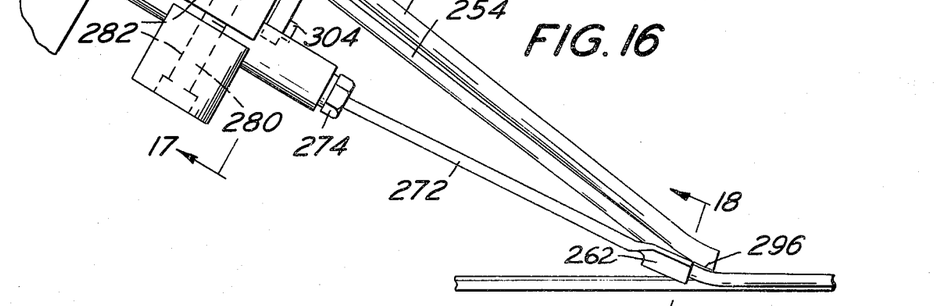
FIG. 16 is a side elevational view of a portion of the apparatus shown in FIG. 15.
Figures 17, 18:
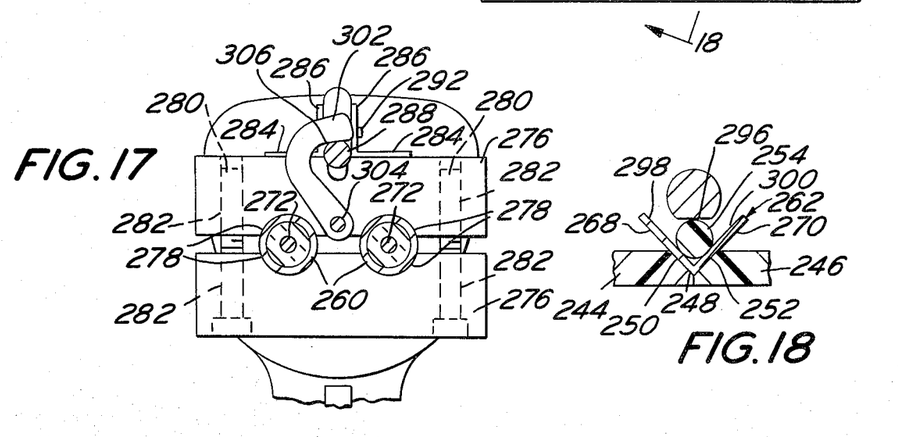
FIG. 17 is a sectional view taken along line 17—17 of FIG. 16.
FIG. 18 is an enlarged sectional view taken along line 18—18 of FIG. 16.

Reference should now be made to FIGS. 16 and 18 to best appreciate the operation of the hand-held apparatus 242.

The filler rod 254 is fed from means (not shown) through guideway 288 and to the inside surfaces 298 and 300 of the V-shaped tip 262. The rotation of the latch 302 toward the elongated member 290 causes its camming surface 306 to work against member 290. This action pivots member 290 about its pivot pins 292 to thereby force the filler rod into intimate heat engagement with the inside surfaces of the heated V-shaped tip 262. Upon the depression of the apparatus on-off button 258, the tip 262 heats up to a temperature approaching the flashpoint of the plastic workpieces and the filler rod.

As previously described, the edges of the two workpieces 244 and 246 to be joined are beveled, such that when abutted, a V-shaped groove 248 results. The filler rod is fed into the groove and is welded to the sidewalls thereof in the following manner: The heated tip is brought into contact with the weld line, i.e. groove 248, and under some downward pressure is drawn therealong whereupon, the filler rod plays out from the apparatus by sliding through the V-shaped tip. Upon contact with the heated inside surface 298 and 300 of the V-shaped tip 262 peripheral surfaces of the filler rod liquify. The liquified surfaces of the filler rod produced by contact with the inside surfaces of the V-shaped tip are wiped away by the tip as rod slides therethrough thereby exposing unoxidized surfaces therebeneath. The sliding movement of the outside surfaces 268 and 270 of the heated tip along the weld line liquifies and wipes away the oxidized layers on the beveled surfaces of the workpieces to expose unoxidized surfaces therebeneath. Immediately downstream of the tip, the unoxidized molten exposed surfaces of the filler rod are forced into contact with the unoxidized molten exposed surfaces of the workpiece by the downward pressure applied to the apparatus. Only slight downward pressure on the apparatus is necessary to ensure that good contact is made between the unoxidized molten surfaces to produce a strong weld joint. When the weld joint is completed, a domed portion of the filler rod (shown by the dotted lines in FIG. 19) extends above the weld zone. This portion can be removed such as by grinding, to provide a flush weld joint.

As can be seen in FIG. 13, the weld joint includes a shallow unwelded seam 308 in the underside of the weld line. Such an unwelded seam will have little effect on the strength of the weld joint inasmuch as each of the beveled surfaces, which make up the major portion of the workpiece's edge, is securely welded to the surface of the filler rod for substantially the full width of the beveled surface.

Figure 20:
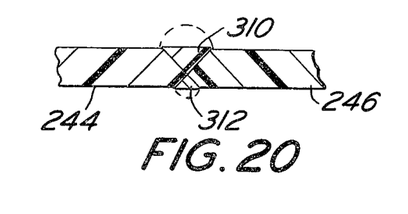
FIG. 20 is a sectional view of another weld joint formed by the apparatus of FIG. 16.

If it is desired that the weld line between the workpieces be integral throughout the thickness thereof, i.e. not include a shallow unwelded seam, the edges of the workpieces can be beveled from both sides thereof as shown in FIG. 20. Thus, when the workpieces are butted, two V-shaped grooves 310 and 312 are formed at their interface. One filler rod can then be welded in groove 310 in the same manner as previously described with reference to FIG. 19 and then the workpiece can be turned over to weld another filler rod into groove 312.

In FIGS. 21 through 31 there are shown various plastic articles which are welded in accordance with this invention. The articles shown therein can be constructed more quickly and easily than utilizing prior art construction techniques, such as blow molding, injection molding, etc.

Figures 21, 22, 23, 24, 25, 26, 27, 28, 29:
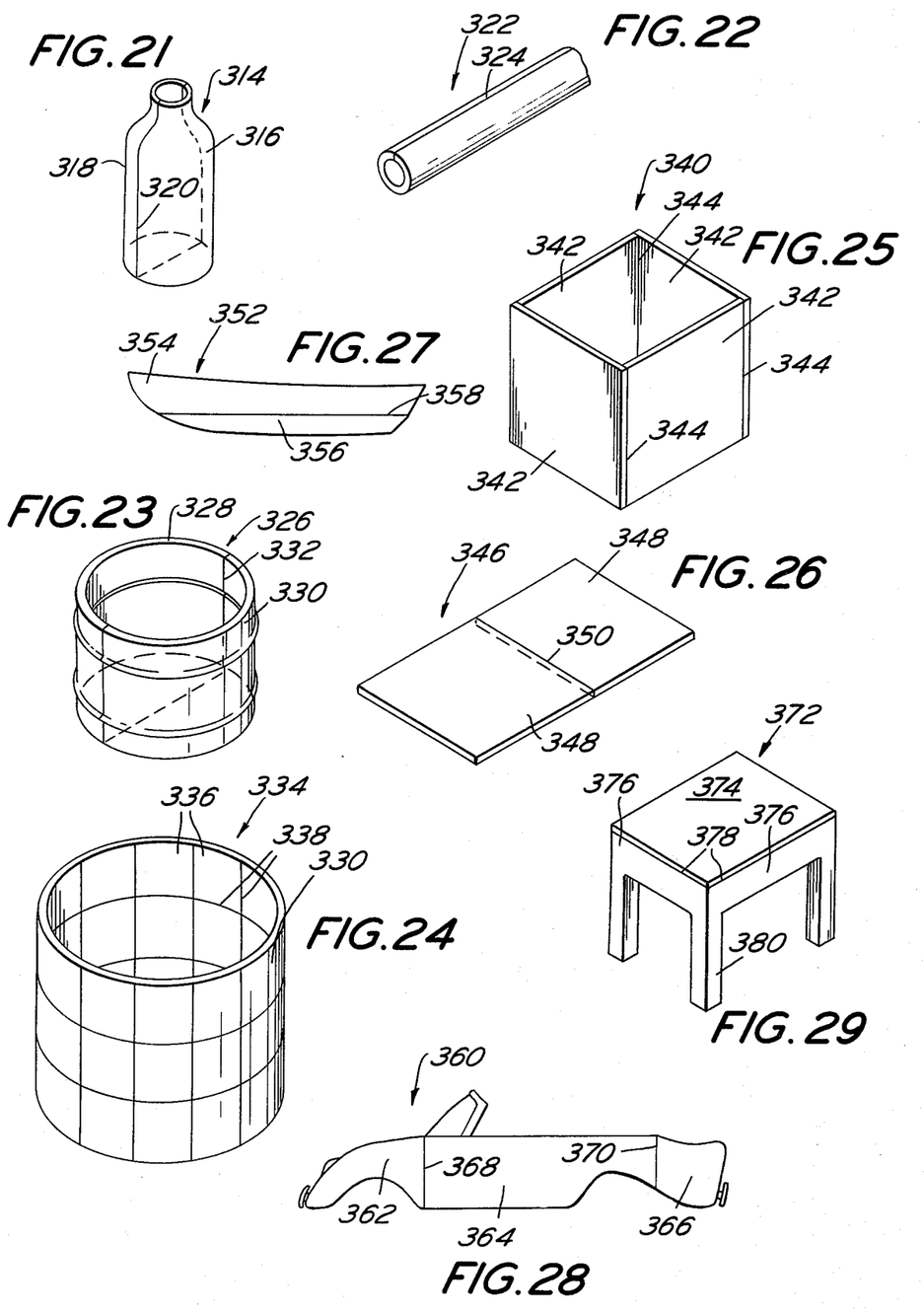
FIG. 21 is a perspective view of a welded bottle in accordance with one aspect of this invention.
FIG. 22 is a perspective view of a portion of a welded pipe in accordance with another aspect of this invention.
FIG. 23 is a perspective view of a welded drum in accordance with another aspect of this invention.
FIG. 24 is a perspective view of a welded tank in accordance with another aspect of this invention.
FIG. 25 is a perspective view of a welded box in accordance with another aspect of this invention.
FIG. 26 is a perspective view of a welded wall in accordance with another aspect of this invention.
FIG. 27 is a side elevational view of a welded boat hull in accordance with another aspect of this invention.
FIG. 28 is a side elevational view of a welded automobile body in accordance with another aspect of this invention.
FIG. 29 is a perspective view of a welded table in accordance with another aspect of this invention.

FIG. 21 shows a plastic bottle 314 including a pair of identical half sections 316 and 318. Each of the half sections include edges 320. The bottle is formed by juxtaposing the edges of the sections, heating the surfaces of the juxtaposed edges to a temperature approaching the flashpoint of the edges to liquify the surfaces, removing the liquified surfaces to expose unoxidized surfaces therebeneath and immediately thereafter forcing the unoxidized surfaces into abutment with one another.

FIG. 22 shows a plastic tube 322 formed of a plastic sheet which has been bent to form the tube and to juxtapose the edges 324 thereof. Once the edges are juxtaposed, the surfaces of the juxtaposed edges are heated to a temperature approaching the flashpoint of the edges to liquify those surfaces. The liquified surfaces are thereafter removed to expose unoxidized surfaces therebeneath and immediately after the removal of the liquified surfaces the exposed unoxidized surfaces and forced into abutment with one another to close the tube.

FIG. 23 shows a storage drum 326 comprising a pair of identical plastic half sections 328 and 330. Each of the half sections include edges 332. The edges of the sections are juxtaposed and the surfaces of the juxtaposed edges are heated to a temperature approaching the flashpoint of the edges to liquify the surfaces. Immediately thereafter, the liquified surfaces are removed to expose unoxidized surfaces therebeneath and once the unoxidized surfaces are exposed, they are forced into abutment with one another to complete the drum.

FIG. 24 shows a storage tank, such as a water tank, etc., including a plurality of identical curved plastic panels 336. Each of the panels include edges 338. The tank is formed by juxtaposing the edges of pairs of adjacent panels, heating the surfaces of the juxtaposed edges to a temperature approaching the flashpoint of the edges to liquify the surfaces, removing the liquified surfaces to expose unoxidized surfaces therebeneath and immediately thereafter forcing the unoxidized surfaces into abutment with one another to complete the tank.

FIG. 25 shows a box formed of a plurality of plastic walls 342. Each of the walls include an edge 344. The box is formed by juxtaposing the edges of a pair of adjacent walls, heating the surfaces of the juxtaposed edges to a temperature approaching the flashpoint of the edges to liquify the surfaces, removing the liquified surfaces to expose unoxidized surfaces therebeneath and immediately thereafter forcing the unoxidized surfaces into abutment with one another.

FIG. 26 shows a planar plastic wall panel 346 composed of a pair of flat plastic sections 348. Each of the sections includes at least one edge 350. The wall panel is formed by the steps of juxtaposing the edge surfaces of the sections, heating the surfaces of the juxtaposed sections to a temperature approaching the flashpoint of the surfaces to liquify the surfaces, removing the liquified surfaces to expose unoxidized surfaces therebeneath and immediately thereafter forcing the unoxidized surfaces into abutment with one another.

FIG. 27 shows a plastic boat hull 352 formed a pair of molded sections 354 and 356. Each of the sections include an edge 358. The hull is joined by juxtaposing the edge surfaces of the sections, heating the juxtaposed surfaces to a temperature approaching the flashpoint of the surfaces to liquify the surfaces, removing the liquified surfaces to expose unoxidized surfaces therebeneath and immediately thereafter forcing the unoxidized surfaces into abutment with one another.

FIG. 28 shows a plastic automobile body including at least three sections 362, 364, and 366. The sections 362 and 364 each include an edge 368 and the sections 364 and 366 each include an edge 370. The separate sections of the body are joined together to form the body by juxtaposing the edge surfaces 368 of sections 362 and 364, heating the juxtaposed surfaces to a temperature approaching the flashpoint of the edges to liquify the surfaces, removing the liquified surfaces to expose unoxidized surfaces therebeneath and immediately thereafter forcing the unoxidized surfaces into abutment with one another. The edges 370 of sections 364 and 366 are welded in an identical manner to the welding of edges 368.

FIG. 29 shows an article of furniture, such as a plastic table 372, including a top section 374 and four side sections 376 (only two of which can be seen). The top section includes edges 378 and the side sections include edges 378 and 380. The table is assembled by juxtaposing the edge surfaces 378 of the top section 374 to the edge surfaces 378 of the side section 376, heating the surfaces of the juxtaposed surfaces to a temperature approaching the flashpoint of the surfaces to liquify the surfaces, removing the liquified surfaces to expose unoxidized surfaces therebeneath and immediately thereafter forcing the unoxidized surfaces into abutment with one another. The edge surfaces 380 of the side section 376 are welded in an identical manner to the welding of edges 378.

As should be appreciated from the foregoing, the plastic welding techniques and apparatus of this invention enable the ready and inexpensive fabrication of large or intricate articles from various stock-shaped plastic components. Furthermore, the weld joint formed between the welded components has a tensile strength approaching that of the plastic itself. As a result of this invention, plastics may be used in various fabrication applications which heretofore had been limited to metals.

Without further elaboration, the foregoing will so fully illustrate our invention that others may, by applying current or furture knowledge, readily adapt the same for use under various conditions of service.

What is claimed as the invention is:

1. A method of welding two plastic body portions having oxidized surfaces together at a predetermined area of each of said surfaces, said oxidized surfaces being capable of being liquified, comprising: juxtaposing the areas of said surfaces, heating the juxtaposed surface areas to a temperature approaching the flashpoint of the plastic surfaces quickly to liquify said surface areas, without appreciably softening the plastic of the body portions contiguously underneath said areas, removing a thin layer of substantially all of the liquified surface area of each body portion to expose unoxidized surfaces therebeneath and immediately thereafter bringing said unoxidized surfaces into abutment with one another.

2. The method of claim 1 wherein the heating of the juxtaposed surface areas is accomplished by contacting said areas with a portion of a tool which has been preheated to a temperature approaching the flashpoint of said plastic surfaces.

3. The method of claim 2 wherein the removal of the liquified surface areas is accomplished by the preheated portion of the tool.

4. The method of claim 3 wherein there is relative movement between the preheated portion of the tool and the juxtaposed surface areas to effect the wiping away of said liquified surfaces.

5. The method of claim 4 wherein the tool is vibrated at a subsonic frequency.

6. The method of claim 4 wherein the juxtaposed surfaces are stationary within a first zone and the preheated portion of the tool is moved therethrough.

7. The method of claim 6 wherein subsequent to the wiping away of the liquified surface areas, the portion of the tool is reheated to a temperature approaching the flashpoint of the plastic surfaces to burn away the plastic which had adhered thereto, thereby readying the tool for another welding operation.

8. The method of claim 7 wherein the reheating is accomplished in a second zone spaced from the first zone.

9. The method of claim 4 wherein the welding occurs in a continuous operation.

10. The method of claim 9 wherein a preheated portion of the tool is always positioned within the first zone with the juxtaposed surfaces being moved therethrough during the welding thereof.

11. The method of claim 10 wherein at the same time that one portion of the tool is effecting the welding of the juxtaposed surfaces, another portion of the tool is being reheated to a temperature approaching the flashpoint of the plastic surfaces to burn away the plastic which had adhered thereto, thereby enabling the welding operation to proceed continuously.

12. The method of claim 11 wherein the reheating is accomplished in a second zone spaced from the first zone.

13. The method of claim 3 wherein said juxtaposed surface areas are edge surface areas of at least one plastic sheet.

14. The method of claim 3 wherein said juxtaposed surface areas are longitudinal edge surface areas of a plastic tube.

15. The method of claim 3 wherein said juxtaposed surface areas are end surface areas of plastic rods.

16. The method of claim 3 wherein said juxtaposed surface areas are end surface areas of plastic bars.

17. The method of claim 3 wherein said juxtaposed surface areas are peripheral surface areas of plastic tubes.

18. The method of claim 3 wherein one of said surface areas is an edge area of a first plastic member and wherein the other of said surfaces area is a first surface of a plastic filler rod.

19. The method of claim 18 wherein an edge surface area of a second plastic member is welded to a second surface area of the filler rod in the same manner that the edge surface area of the first sheet is welded to the first surface area of the filler rod.

20. The method of claim 19 wherein the tool is moved relative to the plastic sheets and the filler rod to wipe away the liquified surface areas.

21. The method of claim 20 wherein the welding of the edge surface areas of the sheets to the respective surface areas of the filler rod is accomplished substantially simultaneously.

22. The method of claim 3 wherein the plastic surfaces are thermoplastic.

23. The method of claim 21 wherein the plastic surfaces are thermoplastic.

24. The method of making a plastic tank formed of a plurality of welded plastic panels, each panel including a body portion having an oxidized surface capable of being liquified comprising: juxtaposing pretermined areas of the surfaces of a pair of adjacent panels, heating the juxtaposed surface areas to a temperature approaching the flashpoint of the plastic surfaces quickly to liquify said surface areas, without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

25. The method of making a plastic tube comprising: bending a plastic sheet having oxidized edge surfaces capable of being liquified to juxtapose predetermined areas of said surfaces and thereby form a tube, heating the juxtaposed surface areas to a temperature approaching the flashpoint of the plastic surfaces quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

26. A method of making a plastic drum formed of at least two welded plastic secitons, each section including a body portion having oxidized surfaces capable of being liquified comprising: juxtaposing predetermined areas of the surfaces of said sections, heating the juxtaposed surface areas to a temperature approaching the flashpoint of the plastic surfaces quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

27. A method of making a plastic bottle formed of at least two welded plastic sections, each section including a body portion having oxidized surfaces capable of being liquified comprising: juxtaposing predetermined areas of the surfaces of said sections, heating the juxtaposed surface areas to a temperature approaching the flashpoint of the plastic surfaces quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

28. The method of making a plastic heat exchanger formed of at least two welded plastic tubes, each tube including a body portion having an oxidized surface capable of being liquified comprising: juxtaposing predetermined areas of the surfaces of said tubes, heating the juxtaposed surface areas to a temperature approaching the flashpoint of the surface areas quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

29. The method of making a plastic box having welded plastic walls, each wall including a body portion having oxidized edge surfaces capable of being liquified comprising: juxtaposing predetermined areas of the surfaces of a pair of adjacent walls, heating the juxtaposed surface areas to a temperature approaching the flashpoint of the plastic surfaces quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

30. The method of making a laminated sheet consisting of at least two welded plastic sheets, each sheet having an oxidized side surface capable of being liquified comprising: juxtaposing predetermined areas of the surfaces of said sheets, heating the juxtaposed surface areas to a temperature approaching the flashpoint of the plastic surfaces quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

31. The method of making a boat hull formed of at least two welded plastic sections, each section including a body portion having oxidized surfaces capable of being liquified comprising: juxtaposing predetermined areas of the surfaces of said sections, heating the juxtaposed surface areas to a temperature approaching the flashpoint of the plastic surfaces quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

32. The method of making an automobile body formed of at least two welded plastic sections, each section including a body portion having oxidized surfaces capable of being liquified comprising: juxtaposing predetermined areas of the surfaces of said sections, heating the juxtaposed surface areas to a temperature approaching the flashpoint of the plastic surfaces quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

33. The method of making a piece of furniture formed of at least two welded plastic sections, each section including a body portion having oxidized surfaces capable of being liquified comprising: juxtaposing predetermined areas of the surfaces of said sections, heating the juxtaposed surface areas to a temperature approaching the flashpoint of said surfaces quickly to liquify said surface areas without appreciably softening the plastic of the body portions contiguously underneath said areas, removing a thin layer of substantially all of the liquified surface area of each body portion to expose unoxidized surfaces therebeneath and immediately thereafter forcing said unoxidized surfaces into abutment with one another.

* * * * *